(12) United States Patent
Fennimore et al.

(10) Patent No.: US 8,381,766 B2
(45) Date of Patent: Feb. 26, 2013

(54) SYSTEMS AND METHODS FOR GENERATING HYDROGEN GAS

(75) Inventors: Keith A. Fennimore, Columbus, NJ (US); John Spallone, Virginia Beach, VA (US)

(73) Assignee: Protonex Technology Corporation, Southborough, MA (US)

( * ) Notice: Subject to any disclaimer, the term of this patent is extended or adjusted under 35 U.S.C. 154(b) by 1362 days.

(21) Appl. No.: 12/043,386

(22) Filed: Mar. 6, 2008

(65) Prior Publication Data

US 2009/0020174 A1 Jan. 22, 2009

Related U.S. Application Data

(60) Provisional application No. 60/905,034, filed on Mar. 6, 2007, provisional application No. 60/905,035, filed on Mar. 6, 2007.

(51) Int. Cl.
F04B 49/00 (2006.01)
F04B 49/03 (2006.01)

(52) U.S. Cl. .............. 137/565.11; 48/61; 137/565.01; 137/565.16

(58) Field of Classification Search ............ 137/565.11, 137/565.16, 565.26

See application file for complete search history.

(56) References Cited

U.S. PATENT DOCUMENTS

| | | | |
|---|---|---|---|
| 4,231,399 A | 11/1980 | Pauliukonis | |
| 4,463,063 A | 7/1984 | Adlhart | |
| 4,490,120 A * | 12/1984 | Hundertmark | 440/61 R |
| 6,274,093 B1 | 8/2001 | Long et al. | |
| 6,932,847 B2 | 8/2005 | Amendola et al. | |
| 7,083,657 B2 | 8/2006 | Mohring et al. | |
| 7,530,931 B2 | 5/2009 | Amendola et al. | |
| 7,641,889 B1 | 1/2010 | Salinas et al. | |
| 2003/0228505 A1 | 12/2003 | Tsang | |

\* cited by examiner

*Primary Examiner* — Melvin C Mayes
*Assistant Examiner* — Colin W Slifka
(74) *Attorney, Agent, or Firm* — Edwards Wildman Palmer LLP; Christine C. O'Day; Brian R. Landry

(57) ABSTRACT

Systems and methods are provided for hydrogen generation utilizing two or more liquid fuel components, using a fuel delivery system comprising a single reversible or bi-directional pump co-operable with flow control means comprising passive or active valves to deliver two or more fuel components to a mixing zone, reaction zone, or reaction chamber of a hydrogen generation system. The pump is operable in a forward direction to deliver one fuel component, and in a reverse direction to deliver a second fuel component. Control of the pump speed, direction and duty cycle of the pump in continuous or pulsed modes provides for delivery of first and second fuel components in desired proportions, to control hydrogen generation. The system also allows for dilution, mixing and flush cycles to be provided using a single pump, reducing the number of active elements required for fuel delivery and flow control in systems using two or more liquid fuel components.

6 Claims, 5 Drawing Sheets

SYSTEMS AND METHODS FOR GENERATING HYDROGEN GAS

CROSS-REFERENCE TO RELATED APPLICATIONS

This application claims priority to U.S. Provisional Patent Application No. 60/905,034 filed Mar. 6, 2007, which is incorporated herein by reference; and is related to the United States patent application filed concurrently herewith, which claims priority to U.S. Provisional Patent Application No. 60/905,035 filed Mar. 6, 2007; all of these applications are commonly assigned.

STATEMENT REGARDING FEDERALLY SPONSORED RESEARCH OR DEVELOPMENT

This invention was made with Government support under Technology Investment Agreement FA8650-04-3-2411 awarded by the United States Air Force.

TECHNICAL FIELD

This invention relates to systems and methods for generating hydrogen gas from borohydride compounds and reformable fuels. More particularly, this invention relates systems and methods for hydrogen generation utilizing two or more liquid fuel components.

BACKGROUND OF THE INVENTION

Fuel cell power systems have an advantage over batteries in that they can be readily refuelable, and therefore a combination of a "replaceable" fuel cartridge and a "permanent" module can allow extended runtime operations without the need for grid electricity for recharging.

Although hydrogen is the fuel of choice for fuel cells, widespread use is complicated by the difficulties in storing the gaseous hydrogen. Many hydrogen carriers, including hydrocarbons, metal hydrides, and chemical hydrides are being considered as hydrogen storage and supply systems for generation of hydrogen on demand, e.g., by reformation from hydrocarbons, desorption from metal hydrides, or catalyzed hydrolysis from metal hydrides and water. Preferably the fuel mixture has a high gravimetric energy density, and controllable hydrogen generation rate, i.e., flow rate and pressure may be controlled to meet demands of a fuel cell.

Reformable fuels, which are typically defined as any substantially liquid or flowable fuel material that can be converted to hydrogen via a chemical reaction known as reformation, including for example hydrocarbons, and chemical hydrides, produce hydrogen and other gaseous and non-gaseous products. For hydrocarbons, the non-hydrogen by-products comprise carbon oxides, e.g., $CO_2$ and CO, and potentially other gaseous products. The resulting hydrogen rich gaseous product stream is typically sent through a purification stream before being sent to, e.g., a fuel cell unit. Hydrocarbon fuels useful for fuel cartridge systems include, for example, methanol, ethanol, methane, propane, butane, gasoline, and diesel fuel. As an example, methanol is a preferred fuel which reacts with water to form hydrogen and carbon dioxide.

$$CH_3OH + H_2O \rightarrow 3H_2 + CO_2 \quad \text{Equation 1}$$

One of the more promising systems for hydrogen storage and generation utilizes borohydride compounds as hydrogen storage media. Such compounds react with water to produce hydrogen gas and a borate in accordance with the following simplified hydrolysis reaction:

$$MBH_4 + 2H_2O \rightarrow MBO_2 + 4H_2 + 300 \text{ kJ} \quad \text{Equation 2}$$

where $MBH_4$ and $MBO_2$, respectively, represent a metal borohydride and a metal metaborate. In practice, the borate is actually in one or more hydrated states, e.g., tetrahydrate, dehydrate, or hemihydrate. The rate of decomposition of the metal borohydride into hydrogen gas and a metal metaborate is pH dependent, with higher pH values hindering the hydrolysis. Accordingly, a stabilizer, such as an alkali metal hydroxide is typically added to solutions of a complex metal hydride in water to be used as the fuel from which the hydrogen gas is generated. Heat or a catalyst, e.g. acids or a variety of transition metals, can be used to accelerate the hydrolysis reaction.

Sodium borohydride ($NaBH_4$) is of particular interest because it can be dissolved in alkaline water solutions with virtually no reaction; in this case, the stabilized alkaline solution of sodium borohydride is referred to as fuel. Furthermore, the aqueous borohydride fuel solutions are non-volatile and will not burn. This imparts handling and transport ease both in the bulk sense and within the hydrogen generator itself.

Various hydrogen generation systems have been developed for the production of hydrogen gas from aqueous sodium borohydride fuel solutions. The advantage of such borohydride hydrogen generation systems is that they can be scaled to feed fuel cells of power ranges from less than 10 watts to greater than 50 kilowatts. In most cases, it is preferred that hydrogen generation systems be efficient and compact, have a high gravimetric hydrogen storage density, and are readily controllable to match hydrogen flow rate and pressure to the operating demands of the fuel cell. The challenge in designing such systems is to maximize energy density by minimizing the associated balance of plant components to reduce volume, weight, parasitic load and general system complexity.

A simple conventional system (FIG. 1) for generating hydrogen on demand comprises a fuel reservoir, fuel lines and a pump for delivering fuel to a reaction zone, or reaction chamber, which may contain a catalyst, and outlets for separation of gaseous hydrogen and other reaction products. However, when there is a requirement for additional fuel components, such as when mixing two or more fuel components of a mixture, or diluting a concentrated fuel mixture, a more complex system is required with additional pumps and flow controllers or fuel regulators.

For example, a system for generating hydrogen from solid and liquid fuel components has been described in U.S. patent application Ser. No. 10/115,269, filed Apr. 2, 2002, now U.S. Pat. No. 7,282,073 entitled "Method and System for Generating Hydrogen by Dispensing Solid and Liquid Fuel Components," which is commonly assigned. Such systems utilize separate dispensing and delivery mechanisms for each fuel component.

Hydrogen generation systems may recycle or recover reaction products to control the reaction or to increase efficiency of conversion. For example, the reactant may be withdrawn from the reaction chamber to stop the reaction as described in described in U.S. Pat. No. 6,534,033 entitled "System for Hydrogen Generation," which is commonly assigned, where, in a process for generating hydrogen from a stabilized metal hydride solution, a reversible fuel pump is in fluid communication with a fuel solution reservoir and a reaction chamber containing a hydrogen generation catalyst. The pump can run in a forward direction to deliver fuel to the reaction chamber and then in a reverse direction to drain the reaction chamber to stop hydrogen generation.

Clogging by precipitation of solid reactants from reactant solutions or precipitations of reactants or reaction products in pumps and valves may be a significant issue. Various approaches are known to allow for controlling the reaction chemistry, or flushing of the system with water or other diluent to reduce clogging. Some systems recycle fuel to increase the efficiency of hydrogen generation. It is preferable in other systems that solid by-products, and fluid reaction products which may precipitate out, are not recycled back to the reaction chamber or the fuel reservoir, to avoid clogging. However, since water is generated in significant quantities as a reaction product in hydrogen fuel cells, it may be recycled into the fuel mixture as a diluent, or used for flushing the system. Such a system which provides for water to be recovered from the exhaust of a fuel cell or condensed from a hydrogen gas stream is described for example in U.S. patent application Ser. No. 10/223,871, now U.S. Pat. No. 7,803,657, entitled "System for hydrogen generation," which is commonly assigned.

Since gravimetric energy density is one of the key factors affecting the cost of hydrogen generation technology, it is desirable to provide a more concentrated fuel solution and a diluent, or multi-component fuel mixtures, which may be stored in concentrated form and mixed or diluted on demand (e.g., hydride and water or other aqueous reactant). Nevertheless, additional pumps required for additional components are a significant cost in dollars and energy density. Pumps are the active mechanical component that are most likely to break down, particularly if clogging is an issue, thus affecting reliability. Thus, current systems have limitations and alternative systems and methods with improved energy density, cost and reliability are required for systems for hydrogen generation on large and small scale when using multi-component fuel mixtures, or for mixing recycled or recovered fluid reaction products with fuel components.

BRIEF SUMMARY OF THE INVENTION

The present invention overcomes or mitigates one or more of the aforementioned limitations of known systems and methods for generation of hydrogen.

Systems and methods are provided for hydrogen generation utilizing two or more liquid fuel components, using a fuel delivery system comprising a single reversible or bi-directional pump co-operable with flow control means comprising passive or active valves to deliver two or more fuel components to a mixing zone, reaction zone, or reaction chamber of a hydrogen generation system. The pump is operable in a forward direction to deliver one fuel component, and in a reverse direction to deliver a second fuel component. Control of the pump speed, direction and duty cycle of the pump in continuous or pulsed modes provides for delivery of first and second fuel components in desired proportions, to control hydrogen generation. The system also allows for dilution, mixing and flush cycles to be provided using a single pump, reducing the number of active elements required for fuel delivery and flow control in systems using two or more liquid fuel components.

A first aspect of the invention provides a hydrogen generation system utilizing a fuel mixture capable of generating hydrogen and comprising at least two liquid fuel components supplied from first and second fuel supply reservoirs, the system comprising: a single reversible pump and flow control means for selectively delivering first and second fuel components to a reaction zone in desired proportions; the flow control means comprising a plurality of valves co-operable with the pump, in a forward cycle of the pump to deliver to the reaction zone one of the first and second fuel components, and in a reverse cycle of the pump to deliver to the reaction zone the other of the first and second fuel components.

The flow control means may comprise a plurality of valves for controlling back flow of first and second fuel components. Advantageously, the flow control means comprises a plurality of passive check valves, such as duckbill or ball type valves, co-operable with the pump to prevent backflow of the first and second fuel components.

Another aspect of the invention provides a hydrogen generation system comprising a first supply reservoir and a second supply reservoir respectively for first and second liquid fuel components of a fuel mixture capable of generating hydrogen via a chemical reaction; a reaction zone; a single reversible pump for delivering the fuel components from the first and second reservoirs to the reaction zone; first and second conduit lines extending respectively between the first supply reservoir and the reaction zone and between the second supply reservoir and the reaction zone, the reversible pump being disposed between the first and second conduit lines in fluid communication therewith; flow control means comprising a plurality of valves in at least one conduit upstream of the reaction zone; the reversible pump being co-operable with the plurality of valves, the pump being operable in a first direction to pump the first fuel component form the first reservoir to the reaction zone, and operable in the reverse direction to pump the second fuel component from the second reservoir to the reaction zone; and control means for selecting at least a duty cycle of the reversible pump for delivering to the reaction zone first and second fuel components in desired proportions.

In a preferred arrangement, the valve means comprises a plurality of check valves, a valve being disposed in each conduit between the supply reservoir and the pump, and a valve being disposed in each conduit between the pump and the reaction zone to prevent backflow in a direction from the reaction zone to the supply reservoirs. Alternatively, the system may provide other arrangements of passive check valves, and active check valves, or a combination thereof, and may comprise three way valves.

Advantageously, the system may further comprise control means for selecting at least one of a pump speed, pump direction, and a duty cycle of the reversible pump for controlling delivery of the first and second fuel components to the reaction zone in desired proportions.

When the reaction mixture requires a catalyst, the reaction zone may comprise a reaction chamber containing an appropriate supported or unsupported catalyst, and may comprise a mixing zone upstream of the reaction zone.

Yet another aspect of the invention provides a pump module for a hydrogen generation system for delivering at least two liquid fuel components from first and second supply reservoirs to a reaction zone, comprising first and second conduits extending from inlets for connection to the first supply reservoir and second supply reservoir respectively, and in fluid communication with at least one outlet, a reversible pump disposed between the first and second conduit lines in fluid communication therewith, flow control means comprising a plurality of valves; the reversible pump being co-operable with the flow control means in a forward direction of the pump to deliver the first fuel component from the inlet from a first reservoir to the outlet, and in a reverse direction of the pump to deliver the second fuel component from the inlet from the second reservoir to the outlet; and means for selecting a duty cycle of the pump to deliver to the outlet a mixture of the first and second fuel components in desired proportions.

Preferably the flow control means comprises a plurality of passive check valves or active valves to prevent backflow of first and second fuel components.

A further aspect of the invention provides a method for delivering a fuel mixture to a hydrogen generation system utilizing a fuel mixture capable of generating hydrogen and comprising at least two liquid fuel components supplied from first and second fuel supply reservoirs, the system comprising a single reversible pump and flow control means comprising a plurality of valves co-operable with the pump in a forward cycle of the pump to deliver to the reaction zone one of the first and second fuel components, and in a reverse cycle mode to deliver to the reaction zone the other of the first and second fuel components; the method further comprising controlling at least one of the pump speed, pump direction and duty cycle to selectively deliver to the reaction zone the first and second fuel components in a desired proportion.

When the first fuel component comprises a concentrated fuel solution and the second fuel component comprises a diluent, the method provides selectively controlling the pump, in a dilution cycle, to deliver to the reaction zone first and second fuel components in a desired proportion for hydrogen generation; and, in a flush cycle, to deliver to the reaction zone only the diluent to provide for flushing of the system.

When the first fuel component comprises a fuel solution and the second fuel component comprises one of reagent and catalyst solution, the method provides for selectively controlling the pump, in a mixing cycle, to deliver to the reaction zone first and second fuel components in a desired proportion for hydrogen generation.

Systems and methods of the present invention can therefore be used for hydrogen generation from fuel mixtures requiring mixing of two or more components of a fuel mixture, for example, to dilute a concentrated fuel component with water or an aqueous reagent, or to mix two components of a fuel mixture (e.g., fuel solution and catalyst solution). Alternatively, where one fuel reservoir contains a fuel mixture, and the second reservoir contains water or another diluent, the pump may be operable to pump a fuel mixture at a desired dilution, or to flush the system with water or diluent, to control the reaction or to reduce clogging.

Thus two or more liquid fuel components may be mixed in variable proportions using a system where the fuel delivery system comprises a single reversible pump and valve means. Preferably the pump provides for controllably selecting the pump speed, pumping direction and duty cycle of the reversible pump for controlling delivery of the first and second fuel components to the reaction chamber in the desired proportion. Beneficially, the operation of the pump is programmably controllable. Thus it is possible to deliver sequentially first and second fuel components in desired proportions to a mixing zone, a reaction zone, or reaction chamber to conveniently provide for dilution, mixing or flush cycles.

Thus, preferred systems and methods of the present invention provide hydrogen generation utilizing a mixture of two or more fuel components using a single reversible pump, and a reduced number of other active elements such as valves.

BRIEF DESCRIPTION OF THE DRAWINGS

Various features, objects and advantages of the invention will become apparent from the following description of preferred embodiments of the invention which are described, by way of example only, with reference to the accompanying drawings, in which.

In the drawings, identical or corresponding elements in the different Figures have the same reference numeral.

DETAILED DESCRIPTION OF THE INVENTION

Figure 1:
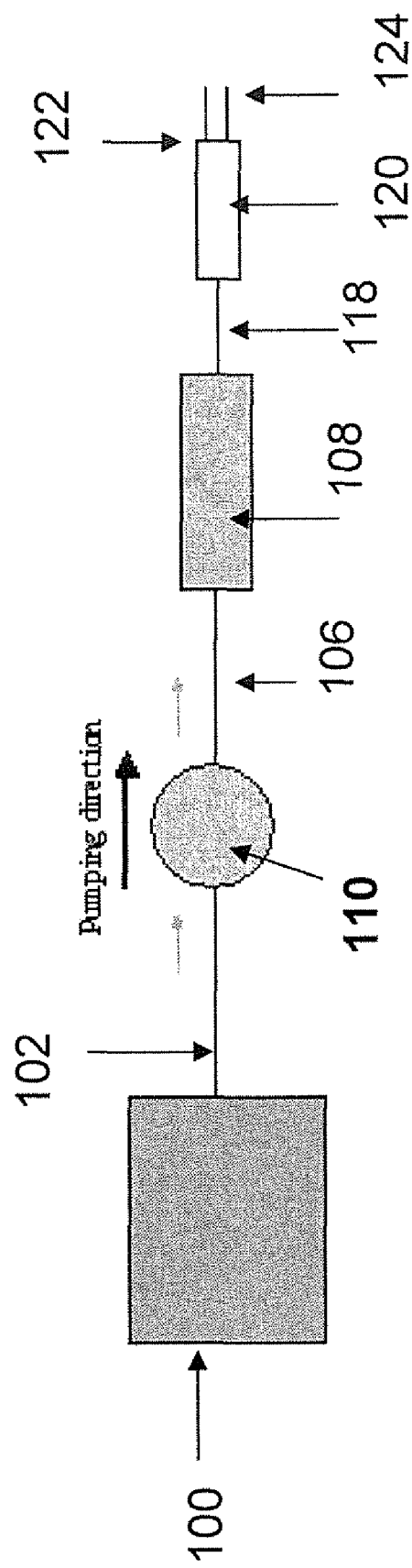
FIG. 1 is a schematic diagram of a conventional known system for generation of hydrogen from a fuel mixture comprising a metal hydride solution.

FIG. 1 illustrates a simple example of a conventional system for hydrogen generation from an aqueous metal hydride solution. Aqueous metal hydride is withdrawn from a reservoir 100 through a conduit line 102, by a fuel pump 110 through conduit 106 into a reaction chamber 108 which may contain a catalyst, where the fuel undergoes a chemical reaction to form a fluid product stream comprising hydrogen, a salt of the metal and water. The product stream is withdrawn through conduit line 118 into a gas liquid separator 120 where the by-product salt is withdrawn as a solution through conduit line 122, and the gaseous hydrogen product mixture comprising hydrogen is withdrawn through conduit line 124. This type of system is typically used for a single fuel mixture supplied from the reservoir. When delivery of additional fuel components or recovered products, dilution or mixing of components, or flushing of the system with water or diluent are required, in known prior art systems, additional pumps and valves must typically be added to the system for each additional fuel component.

Figure 2:
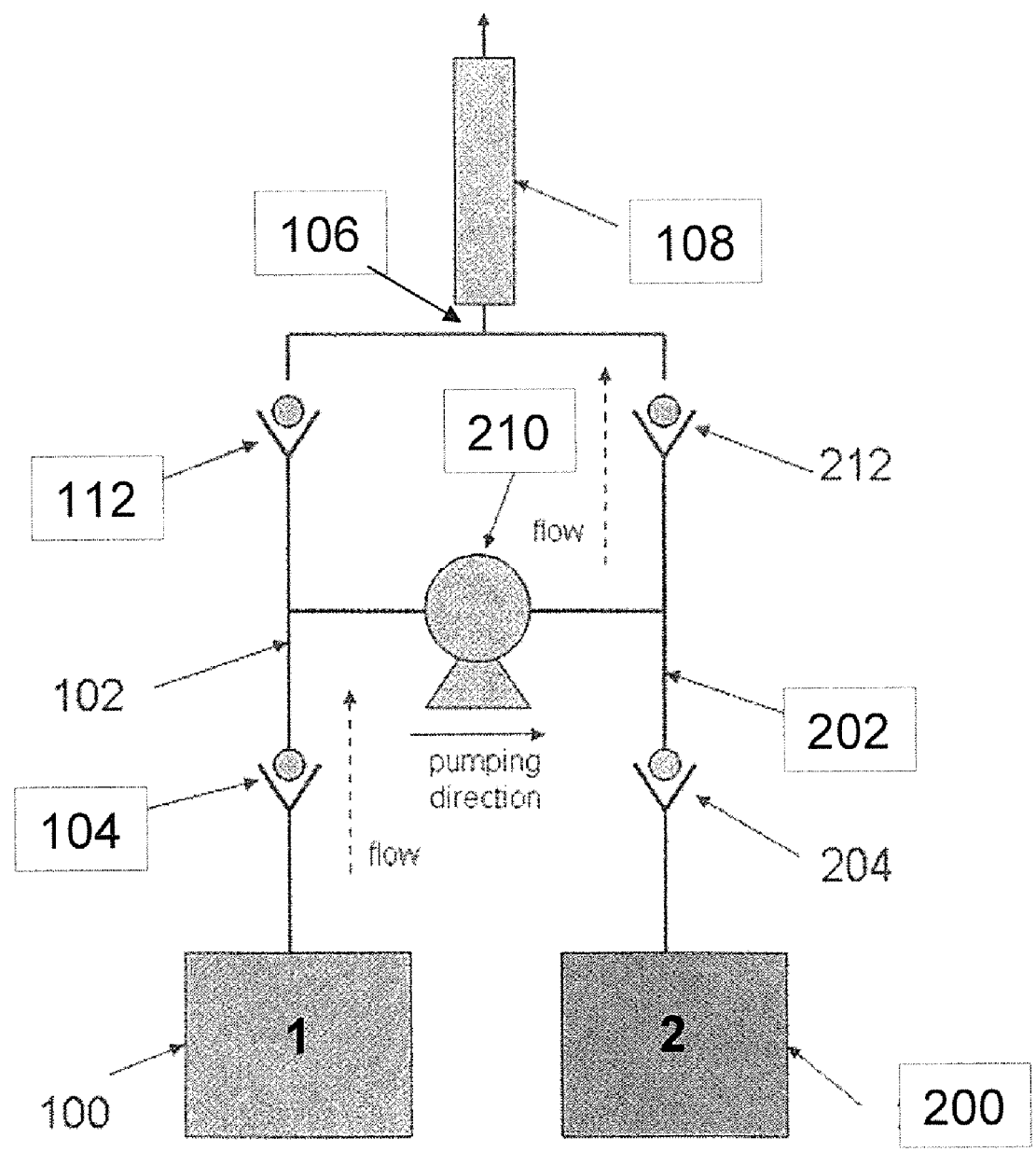
FIG. 2 is a schematic diagram of a system for hydrogen generation according to a first embodiment of the invention showing liquid flow in the forward cycle of a reversible pump.
Figure 3:
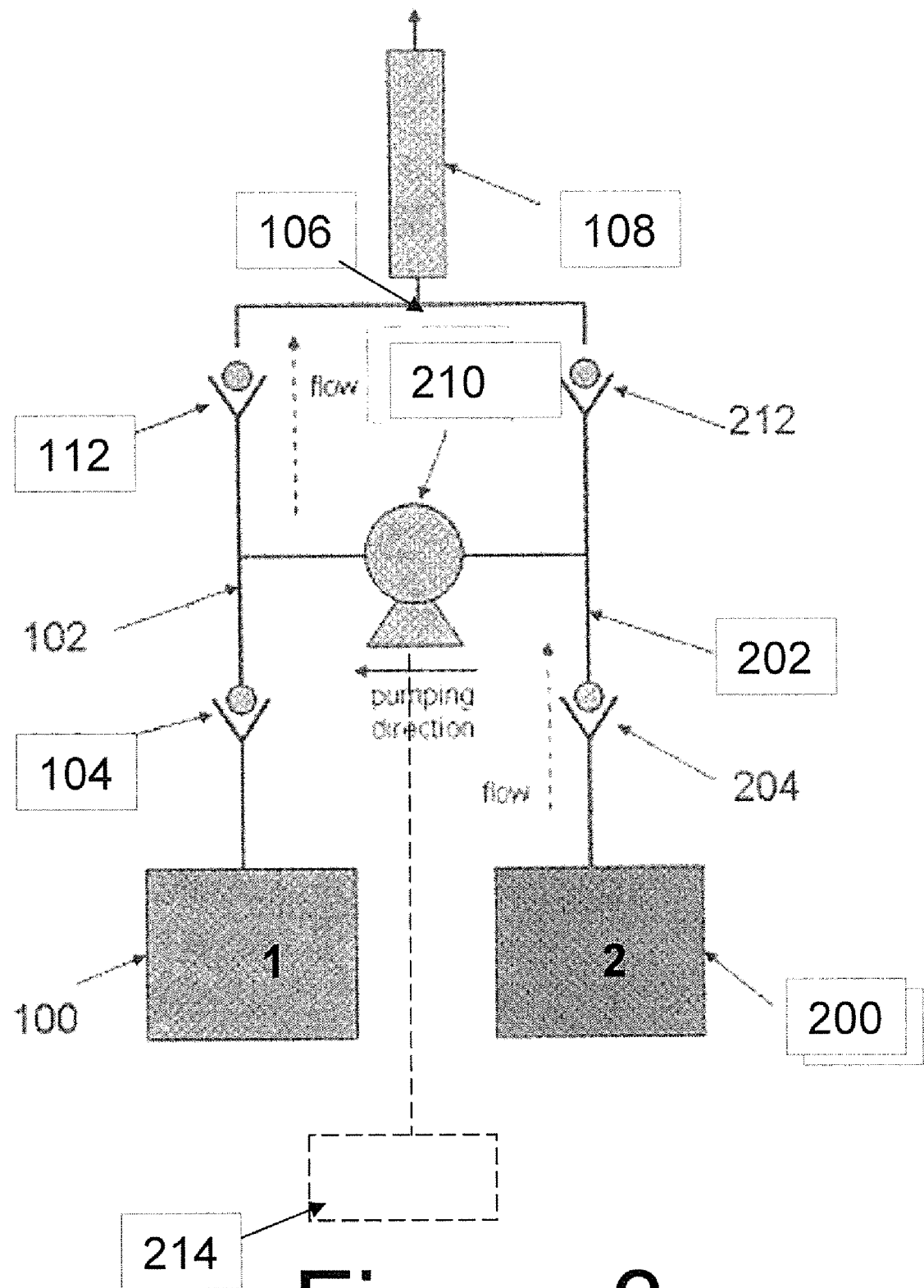
FIG. 3 is a schematic diagram of a system for hydrogen generation according to a first embodiment of the invention showing liquid flow in the reverse cycle of a reversible pump.

A hydrogen generator according to an embodiment of the present invention is shown schematically in FIGS. 2 and 3. The system comprises a first supply reservoir 100 and second supply reservoir 200 for first and second fuel components 1, 2 of a fuel mixture for generating hydrogen; a reaction zone comprising reaction chamber 108 which may include a supported or unsupported catalyst (not shown); first and second conduits 102, 202, for delivering the first and second fuel components to the reaction chamber 108. Means for controlling flow of fuel components and controlling delivery of fuel mixture to the reaction chamber are disposed between the reservoirs and the reaction chamber and comprise, e.g., a reversible (bi-directional) pump 210, for example, a peristaltic pump, and valve means comprising a plurality of valves located upstream of the reaction chamber between the pump and the reaction chamber to limit or control back flow of the fuel components towards the fuel supply reservoirs. Beneficially, as shown in FIGS. 2 and 3, the system comprises four check valves, check valves 104, 204 being disposed in each conduit 102, 202 between the reservoir and the pump, and check valves 112, 212 in each conduit between the pump and the reaction chamber to prevent backflow. In a preferred system, the valves are passive check valves, e.g., "duck-bill" or "ball type" check valves. Alternatively, the valves may be active (e.g., globe or gate) valves. Thus, in operation, the pump is operable to deliver fuel components 1 from the first fuel reservoir 100 to the reaction chamber as shown schematically in FIG. 2, and the pump is operable in a reverse direction to deliver fuel components 2 from the second fuel reservoir 200 to the reaction chamber as shown in FIG. 3.

Since the check valves 104, 204, 112, 212 limit or prevent backflow in the first and second conduits 102, 202 in a direction from the reaction chamber 108 towards the fuel supply reservoirs 100, 200, it will be appreciated that controlling operation of the reversible pump alternately in the forward and reverse direction alternates delivery of the first and second fuel components from the first supply reservoir 100 and second supply reservoir 200. Varying the pump speed and pump direction through pump control means 214, e.g. by sending appropriate control signals to the pump from a pump controller or system controller, provides for control of the rate of fuel delivery to the reaction zone, and the fuel mix. Thus the pump parameters can be used to control the rate of hydrogen generation. For example, the forward and reverse cycles may be of the same duration, or different durations to deliver the two fuel components in desired proportions to the reaction chamber. With the use of passive check valves as illustrated in FIG. 2, the pump may be controlled relatively simply by selecting at least one of a pump speed, pump direction, and a duty cycle of the reversible pump for controlling delivery of the first and second fuel components to the reaction zone in desired proportions. As described in more detail below with respect to FIG. 4, the system may include control means 110 for programmably controlling operation of the pump, and if active valves are used, for modulating operation of the valves.

For example, in use of one illustrative system in accordance with the present invention for generating hydrogen from a relatively concentrated solution of, e.g., 20 wt-% sodium borohydride solution, this first fuel component is held in the first fuel supply reservoir, and water is held in the second supply reservoir. The pump 210 is cyclically driven in the forward direction at a constant rate for 2 seconds to deliver borohydride fuel solution, and then the pump is driven in reverse at the same rate for 0.5 seconds to deliver water, thereby delivery the two components in a 4 to 1 ratio to the reaction chamber. Thus the theoretical effective concentration of sodium borohydride delivered to the reaction chamber is 16 wt-%.

In use, the illustrative system shown in FIGS. 2 and 3 for generation of hydrogen from a liquid fuel component such as sodium borohydride, held in the first fuel supply reservoir 100 and a diluent such as water, held in the second supply reservoir 200, when the pump 210 is operated in a forward direction as shown in FIG. 2, the first fuel component is withdrawn from the first fuel supply reservoir 100, and pumped from the reservoir 100 through conduit 102 and check valve 104, through the fuel pump 210 in a forward direction, and through check valve 212 and delivered to the reaction chamber 108 (fluid flow as in FIG. 2). Passive check valves 204 and 112 close to restrict back flow and in particular restrict or prevent flow of fluid back to the second supply reservoir 200. During operation of the pump 210 in the reverse direction, diluent is withdrawn from the second supply reservoir 200, through conduit 202 and check valve 204, through the pump 210 and through check valve 112 and delivered to the reaction chamber (fluid flow as in FIG. 3), while check valves 212 and 104 close to prevent backflow. As shown in FIGS. 2 and 3, the two conduits 102 and 202 may converge to form a mixing zone 106 upstream of the reaction chamber 108, and in use, the chamber may contain a supported or unsupported catalyst (not shown) to catalyze the reaction for generation of hydrogen within the chamber 108. The dilution of the fuel mixture and rate of delivery may be controlled by selecting the pump speed and duty cycle of the pump in forward and reverse directions, as described above.

Continuous operation of the pump 210 for a period in the reverse direction also provides for flushing the reaction chamber with diluent from the second supply reservoir 200, thereby flushing residues from the chamber, and/or for controlling or stopping hydrogen generation.

It will be apparent that the system described above, comprising a single reversible pump 210 and an arrangement of 4 check valves 104, 204, 112, 212 provides a simple and reliable way of controllably delivering two components of a fuel mixture, or a concentrated fuel mix and a diluent, to a mixing zone or to a reaction chamber, as well as providing for flushing of the reaction chamber.

Alternatively, where fuel is supplied to the reaction chamber 108 from the first supply reservoir 100 at a desired concentration and dilution is unnecessary, the pump 210 may be operated continuously in the forward direction during hydrogen generation; the second supply reservoir 200 may contain diluent, catalyst solution, or water for flushing or controlling the reaction as needed, by operation of the pump 210 in the reverse direction.

The system is particularly advantageous for dilution of a concentrated fuel solution, when the fuel solution may be stored in a greater concentration than is typically fed to the catalyst in the reaction chamber, and may even be used when the fuel is stored as a slurry or suspension, and mixed with water or other diluent on demand (and may include water recovered from product flow or from a fuel cell) thus improving efficiency in storage and gravimetric hydrogen storage density or energy density.

The illustrative embodiments described above with respect to sodium borohydride solution and a diluent for generating hydrogen are given by way of example only. It will be apparent that the systems of the embodiments described above and other embodiments may be used for generation of hydrogen from many other fuel mixtures comprising two or more fuel components.

Other suitable fuel mixtures for generation of hydrogen are more fully described in detail in U.S. Provisional Application Ser. No. 60/905,034, which is incorporated herein by reference.

EXAMPLE

The following provides a more detailed description of use of the system comprising a reversible pump as shown in FIGS. 2 and 3 for generation of hydrogen from two components of a fuel mixture.

In operation of the system to provide a method of generating hydrogen according to one embodiment, the fuel comprises a metal hydride fuel component that is a complex metal hydride that is water soluble and stable in aqueous solution. Examples of suitable metal hydrides are those borohydrides having the general formula $M(BH_4)_n$, where M is an alkali or alkaline earth metal selected from Group 1 (n=1) or Group 2 (n=2) of the periodic table, such as sodium, potassium, lithium, calcium or magnesium. Examples of such compounds include without intended limitation $NaBH_4$, $KBH_4$, $LiBH_4$, $Ca(BH_4)_2$ or $Mg(BH_4)_2$. These metal hydrides may be utilized in mixtures, but are preferably utilized individually. Sodium borohydride is preferred in the present invention due to its comparatively high solubility in water, about 35% by weight as compared to about 19% by weight for potassium borohydride. Typically, the fuel solution is comprised of from about 10% to 35% by wt. sodium borohydride and from about 0.01 to 5% by weight sodium hydroxide as a stabilizer.

Since some water is consumed in the hydrogen generation process shown in Equation 2 and additional water is lost as steam, the product stream containing the borate salt is more concentrated than the initial borohydride fuel mixture. Precipitation of the product salt from a concentrated solution in the reaction chamber itself or in any of the associated downstream apparatus will render the system ineffective until disassembled and cleaned. To prevent such precipitation, a water flush cycle is typically used to ensure that any precipitates or saturated borate solution are washed out of the system. In typical known hydrogen generation systems such as that illustrated in FIG. 1 an additional separate water tank with its own pump and plumbing (not shown) would need to be incorporated into the system to provide the desired flushing cycle.

The improved system provided in FIGS. 2 and 3 can utilize one fuel pump to deliver both the active fuel component and water, and facilitates mixing and dilution cycles as well as flushing cycles with a single pump.

In operation of the system to provide a method of generating hydrogen according to another embodiment, the first fuel component comprises an aqueous metal borohydride solution and the second fuel component comprises water. The water component may contain other additives in solution, for example, common anti-freeze agents such as ethylene glycol.

A first fuel component, i.e. aqueous metal hydride solution, is held in reservoir 100, and water is held in reservoir 200. When pump 210 is operated in the forward direction, the metal hydride solution 1 is pumped from reservoir 100 through conduit 102, check valves 104 and 212, and delivered to reaction chamber 108 where it undergoes reaction to form a fluid product stream comprising hydrogen, a salt of the metal and water with the direction of liquid flow as shown in FIG. 2. The product stream is fed to a gas liquid separator (not shown) and other components to separate and collect the byproduct salt and hydrogen. During pumping, valves 204 and 112 prevent back flow of the fuel into fuel component reservoir 100 and fuel component reservoir 200.

Upon completion of a hydrogen generation cycle such as when the system is to be turned off, pump 210 is operated in the reverse direction, and liquid flow is as shown in FIG. 3. Water is withdrawn from reservoir 200 via conduit 202 through a valve 204 and valve 112 to deliver water to the reaction chamber 108, thereby flushing the system and rinsing residues from within the hydrogen generation system. Valves 104 and 212 operate to prevent back flow into fuel component reservoir 100 and fuel component reservoir 200. This system therefore allows for a simple, low-parasitic load method for flushing system components with water.

The reaction chamber 108 preferably includes a catalyst bed comprising a catalyst metal supported on a substrate. The preparation of such supported catalysts is taught, for example, in U.S. Pat. No. 6,534,033 entitled "System for Hydrogen Generation," the disclosure of which is incorporated herein by reference. Suitable transition metal catalysts for the generation of hydrogen from a metal hydride solution are known in the art and include metals from Group 1B to Group VIIIB of the Periodic Table, either utilized individually or in mixtures, or as compounds of these metals. Representative examples of these metals include, without intended limitation, transition metals represented by the copper group, zinc group, scandium group, titanium group, vanadium group, chromium group, manganese group, iron group, cobalt group and nickel group. Specific examples of useful catalyst metals include, without intended limitation, ruthenium, iron, cobalt, nickel, copper, manganese, rhodium, rhenium, platinum, palladium, and chromium. As is known, the catalyst may also be in forms of beads, rings, pellets or chips. It is preferred that structured catalyst supports such as honeycomb monoliths or metal foams be used in order to obtain the ideal plug flow pattern and mass transfer of the fuel to the catalyst surface.

As an alternative approach to a water flush cycle, precipitation problems and clogging can be reduced or avoided by utilizing a dilute fuel feed to reduce the possibility of the system becoming clogged as a result of insufficient water in the product stream to maintain the borate product salt in solution. The advantages of such dilution are set forth in U.S. patent application Ser. No. 10/223,871, filed Oct. 20, 2002, entitled "System for Hydrogen Generation," which is commonly assigned, the disclosure of which is incorporated herein by reference. The system described herein may advantageously be used to dilute a fuel solution held in the first reservoir with water held in the second reservoir.

Thus in operation of the system to provide a method according to another embodiment, a concentrated borohydride solution is held in the first reservoir 100, and water is held in the second reservoir. The pump is operated in cycles as illustrated in FIGS. 2 and 3, and by cycling the pump 210 in "forward" and "reverse" cycles in rapid succession water is periodically added to the aqueous borohydride stream, effectively diluting the fuel to a lower concentration. Thus, predetermined amounts of borohydride solution and water are sequentially delivered to the reaction chamber in desired proportions to provide a fuel mixture of suitable concentration for hydrogen generation.

Figure 4:
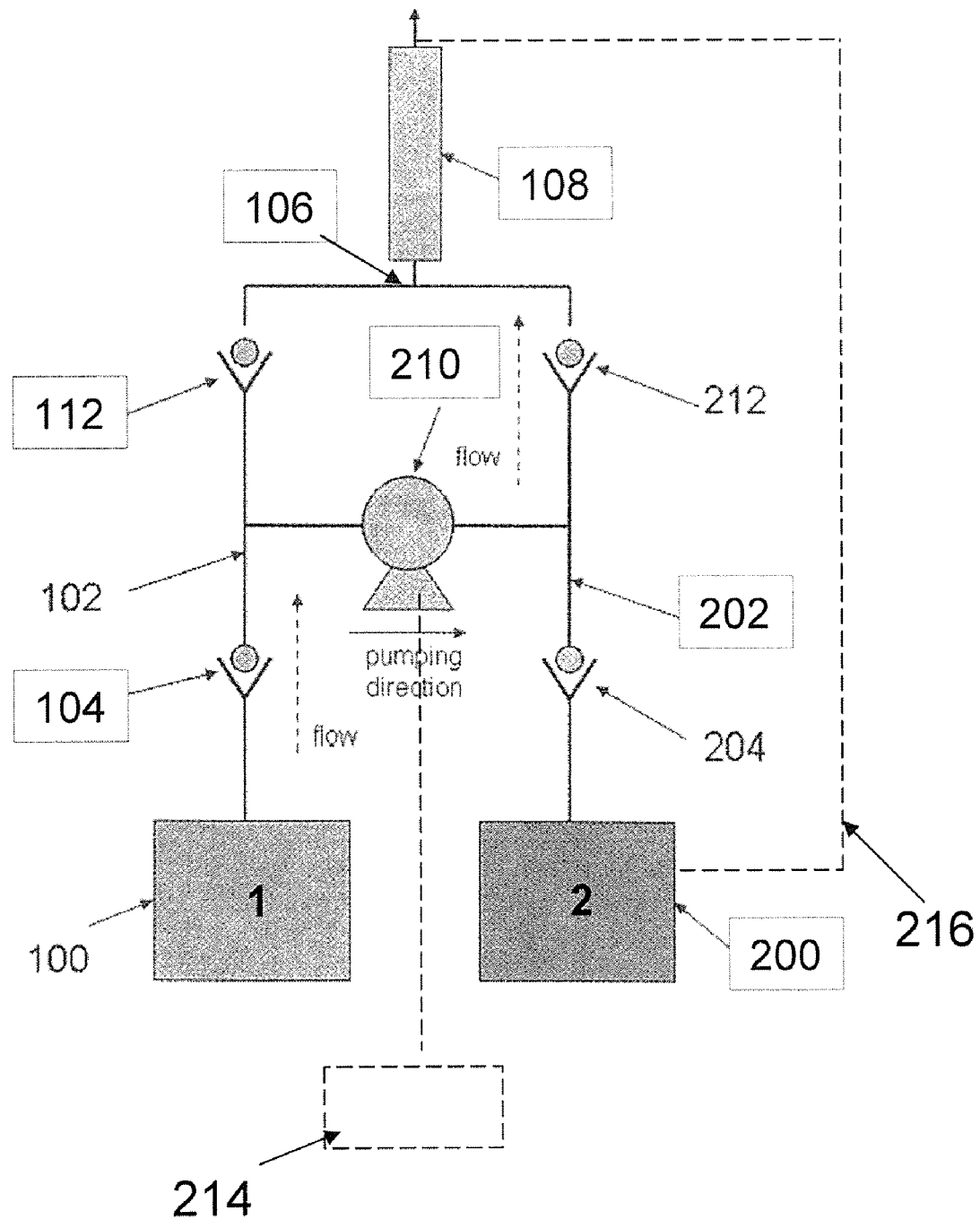
FIG. 4 is a schematic diagram of a system for hydrogen generation according to a second embodiment of the invention.

That is, as mentioned above, when the first fuel component comprises, e.g., a 20 wt-% sodium borohydride solution, when pump 210 is cyclically driven "forward" at a constant rate for 2 seconds to deliver the borohydride fuel component, and then in reverse at the same rate for 0.5 seconds to deliver water, the theoretical effective concentration delivered to reactor 108 is a 16 wt-% sodium borohydride solution. Advantageously, as shown in FIG. 4, the system comprises control means 214, e.g., to provide control signals to the pump for selecting the pump parameters such as the pump speed, pump direction, and duty cycle to allow sequential delivery of the two fuel components to the reaction chamber 108 and/or mixing zone 106 upstream of the reaction zone, in a desired proportion. Optionally, where the diluent is water, a conduit 216 for water recovered from the product stream from the reaction chamber 108 or from a fuel cell (not shown) may be provided to supply recovered water to replenish the second reservoir 200. The pump cycle may be selected to provide both a dilution cycle for generation of hydrogen, and a flush cycle as needed, or to alternate cycles to control the rate of hydrogen generation.

This arrangement allows for fuel components to be stored at a greater concentration than is typically fed through the catalyst bed, improving gravimetric hydrogen storage density. In addition, such a dilution scheme allows the storage of slurry or the suspension of an aqueous borohydride mixture where the concentration of the metal hydride in the fuel system exceeds the maximum solubility of the particular salt utilized. Hot water recovered from the product stream from hydrogen generation or from a fuel cell may usefully be used for dilution of the concentrated mixture.

In operation of the system to provide a method of generating hydrogen according to another embodiment, the first fuel component comprises an aqueous metal borohydride solution and the second fuel component comprises a catalyst solution. Suitable catalyst solutions include acidic catalysts, i.e., catalysts having a pH less than 7, include inorganic acids, including the so-called "mineral acids," such as hydrochloric acid (HCl), sulfuric acid ($H_2SO_4$), and phosphoric acid ($H_3PO_4$), and organic acids such as acetic acid ($CH_3COOH$), malic acid ($C_4H_6O_5$), and water soluble transition metal salts such as cobalt chloride ($CoCl_2$).

When pump 210 is operated in the forward direction as shown in FIG. 2, an aqueous metal borohydride solution is pumped from reservoir 100 via conduit line 102 through check valves 102 and 212 by fuel pump 210 and delivered to reaction chamber 108. The catalyst solution is delivered to the reaction chamber by operation of pump 210 in the reverse direction so that liquid flow is as shown in FIG. 3. The combination of the two fuel components in the reaction chamber produces hydrogen and a salt of the metal in accordance with Equation 2. Beneficially, the system comprises control means 214 for controlling the pump cycle to deliver the appropriate mixing cycle. For example, the pump cycle may be programmably controlled to deliver a continuous flow of a large flow of fuel components in desired proportions so that a steady stream of hydrogen is generated continuously over a period of time or alternatively small sequential portions or pulses of each component so that hydrogen is produced in short bursts, to generate hydrogen at an appropriate rate to meet demand, e.g., for a fuel cell.

Figure 5:
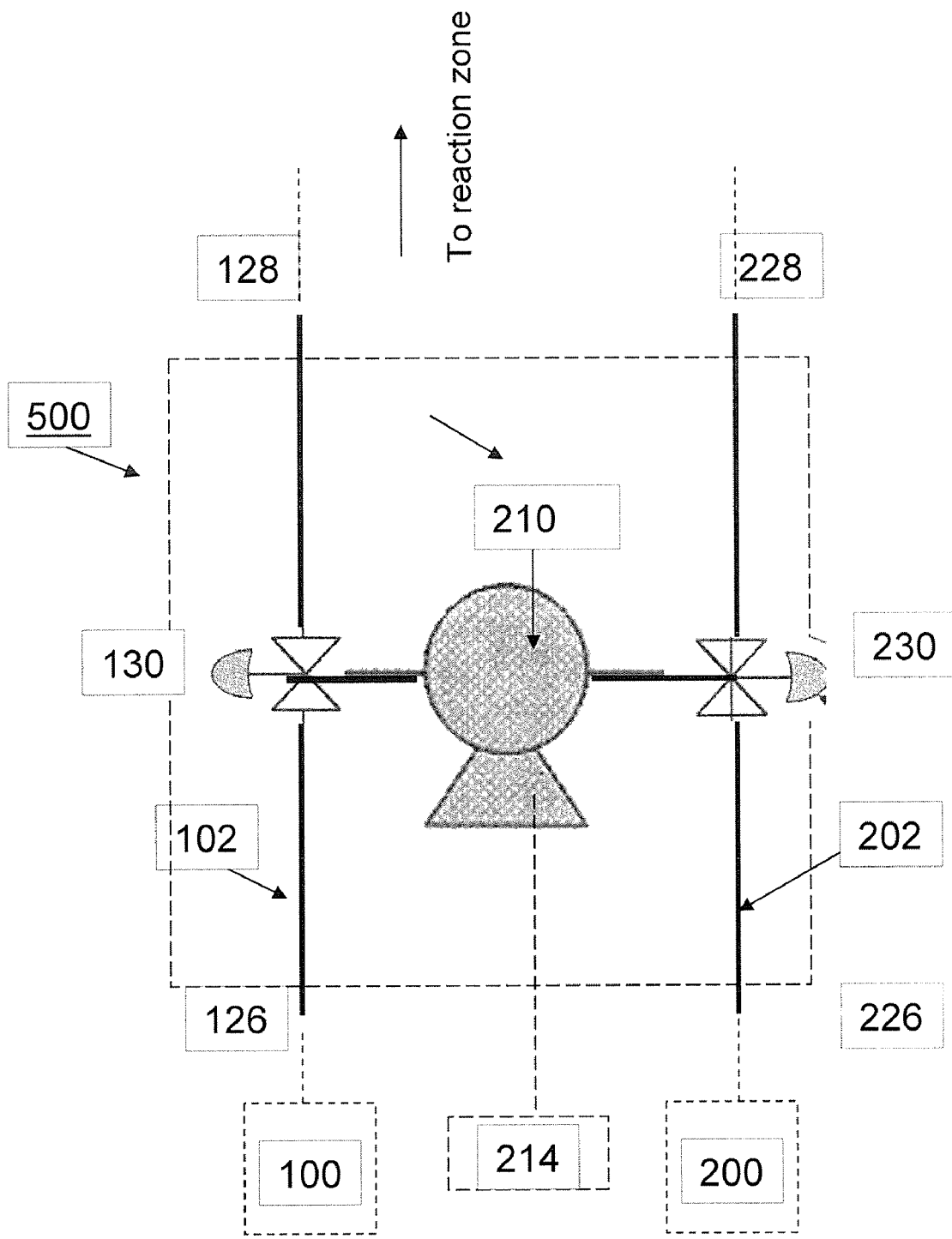
FIG. 5 is a schematic diagram of a pump module according to another embodiment of the invention.

While the embodiments described in the Example above use passive check valves for simplicity, other types of valves may be used. For example, three way valves are also suitable and sufficiently resistant to clogging. Thus a three-way valve may be used instead of each pair of passive one-way check valves shown in FIGS. 2 and 3. FIG. 5 illustrates another embodiment of the invention showing such an arrangement in a pump unit or module 500 comprising two three way valves. First and second port of each three way valve 130 and 230 provide for connections to respective first and second conduits 102 and 202 which extend between inlets 126 and 226 of the module for connection to first and second fuel supply reservoirs 100 and 200 of a hydrogen generation system as described above, and outlets 128 and 228 for connection to a mixing zone or reaction zone of the hydrogen generation system. The third port of each valve is connected to respective ports of the reversible pump as shown in FIG. 5.

The pump 210 provides for connection to controller 214 of the hydrogen generation system which may control modulation of the operation of three way valves 130 and 230, together with selectively cycling of the pump 210 in forward and reverse direction. The pump module therefore provides for control of mixing, dilution and flush cycles, and controlling the rate of hydrogen generation, as described above.

Advantageously, for hydrogen generation systems utilizing more than two liquid fuel components and/or providing for recycling of recovered water, flow control means may be utilized as described in the above referenced co-pending U.S. patent application filed concurrently herewith and claiming priority to U.S. Provisional Patent Application Ser. No. 60/905,035. For example, additional three-way valves, or other active valve arrangements, that may be controlled by the control system may be used in conjunction with the reversible pump system described above to provide for controlled and selective delivery of more than two fuel components in desired proportions to the reaction zone to provide for mixing, dilution and flushing cycles. Also, as described in the co-pending application, the control system may be responsive to external or system conditions to control a fuel mix or flow rate.

The embodiments of the system described above provide for hydrogen generation in systems utilizing two or more fuel components where delivery and regulation of fuel components is accomplished with a single pump unit for fuel regulation, i.e., one pump co-operable with flow control means comprising a configuration of valves and conduits, instead of requiring an additional pump for regulation and delivery of more than two fuel components, and is intended to reduce the number of pumps required to be provided and maintained. As described herein, the preferred single pump systems having flow control means co-operable with the single pump do not encompass a second or additional pump unit for regulation of flow and delivery of two or more fuel components from fuel reservoirs to a reaction zone.

Although preferred embodiments of the invention have been described and illustrated in detail, it is to be clearly understood that these are by way of illustration and example only and not to be taken by way of the limitation, the scope of the present invention being limited only by the appended claims.

What is claimed as new and desired to be protected by Letters Patent of the United States is:

1. A hydrogen generation system comprising:
    a first supply reservoir and a second supply reservoir respectively for first and second liquid fuel components of a fuel mixture capable of generating hydrogen via a chemical reaction;
    a reaction zone;
    a single reversible fuel delivery pump for delivering the fuel components from the first and second reservoir to the reaction zone;
    first and second conduit lines extending respectively between the first supply reservoir and the reaction zone and between the second supply reservoir and the reaction zone,
    the reversible pump being disposed between the first and second conduit lines in fluid communication therewith;
    flow control means comprising a plurality of valves in at least one conduit upstream of the reaction zone;
    wherein the reversible pump is co-operable with the a plurality of valves, the pump being operable in a first direction to pump the first fuel component from the first reservoir to the reaction zone, and operable in the reverse direction to pump the second fuel component from the second reservoir to the reaction zone; and
    control means for selecting a duty cycle of the reversible pump for delivering to the reaction zone first and second fuel components in desired proportions.

2. A system for hydrogen generation according to claim 1 wherein the flow control means comprise a check valve disposed in each conduit between the supply reservoir and the pump, and a check valve disposed in each conduit between the pump and the reaction zone, to prevent backflow in a direction from the reaction zone to the supply reservoirs.

3. A hydrogen generation system according to claim 1 wherein the flow control means comprise first and second three-way valves.

4. A hydrogen generation system according to claim 1, wherein the flow control means controls at least one of a pump speed, pump direction, and a duty cycle of the reversible pump for controlling delivery of the first and second fuel components to the reaction zone in desired proportions.

5. A hydrogen generation system according to claim 1 wherein the reaction zone comprises a reaction chamber containing a catalyst.

6. A hydrogen generation system according to claim 1 further comprising a mixing zone upstream of the reaction zone.

* * * * *